United States Patent
Omori et al.

(10) Patent No.: US 8,174,456 B2
(45) Date of Patent: May 8, 2012

(54) CONTROL SYSTEM AND METHOD FOR REDUCING DIRECTIONAL ERROR OF ANTENNA WITH BIAXIAL GIMBAL STRUCTURE

(75) Inventors: Go Omori, Nishinomiya (JP); Tomoyuki Matsuyama, Nishinomiya (JP); Hitoshi Maeno, Nishinomiya (JP); Satoshi Adachi, Nishinomiya (JP)

(73) Assignee: Furuno Electric Co., Ltd., Hyogo (JP)

( * ) Notice: Subject to any disclaimer, the term of this patent is extended or adjusted under 35 U.S.C. 154(b) by 229 days.

(21) Appl. No.: 12/746,450

(22) PCT Filed: Dec. 4, 2008

(86) PCT No.: PCT/JP2008/072071
§ 371 (c)(1),
(2), (4) Date: Jun. 4, 2010

(87) PCT Pub. No.: WO2009/072570
PCT Pub. Date: Jun. 11, 2009

(65) Prior Publication Data
US 2010/0265149 A1    Oct. 21, 2010

(30) Foreign Application Priority Data
Dec. 7, 2007  (JP) ................................ 2007-316647

(51) Int. Cl.
*H01Q 3/00*   (2006.01)
(52) U.S. Cl. ....................................................... 343/766
(58) Field of Classification Search ............... 343/766, 343/767–769, 702
See application file for complete search history.

(56) References Cited

U.S. PATENT DOCUMENTS

| | | | |
|---|---|---|---|
| 5,243,358 A * | 9/1993 | Sanford et al. | 343/836 |
| 5,552,798 A * | 9/1996 | Dietrich et al. | 343/893 |
| 6,281,847 B1 * | 8/2001 | Lee | 343/700 MS |
| 6,313,805 B1 * | 11/2001 | Nishiyama | 343/766 |
| 6,738,024 B2 * | 5/2004 | Butler et al. | 343/766 |
| 6,889,421 B1 * | 5/2005 | Matz et al. | 29/600 |
| 7,825,873 B2 * | 11/2010 | Fond et al. | 343/895 |
| 2008/0068281 A1 * | 3/2008 | Fond et al. | 343/895 |
| 2011/0115678 A1 * | 5/2011 | Owens | 343/702 |

FOREIGN PATENT DOCUMENTS

| | | |
|---|---|---|
| JP | 05-025972 A | 2/1993 |
| JP | 05-259721 A | 10/1993 |
| JP | 07-154127 A | 6/1995 |
| JP | 07-154128 A | 6/1995 |
| JP | 08-211140 A | 8/1996 |
| JP | 09-008533 A | 1/1997 |

* cited by examiner

*Primary Examiner* — Huedung Mancuso
(74) *Attorney, Agent, or Firm* — Global IP Counselors, LLP

(57) ABSTRACT

An antenna pointing control apparatus and method that reduce a pointing error of an antenna having a two-axis gimbal structure. An antenna installed on a ship hull is controlled to point toward a satellite by an antenna pointing control apparatus having a two-axis mechanism. Movement of the ship hull are recognized every prescribed cycle time, a satellite bearing is measured, and a pointing error of a directional antenna with respect to a satellite is detected. If it is determined that the satellite will not pass within a prescribed region A about an extension line of an azimuth angle (AZ) axis of the ship's hull, then a two-axis control is executed. However, if the satellite will pass within the prescribed region A, then a virtual three-axis control is executed.

12 Claims, 14 Drawing Sheets

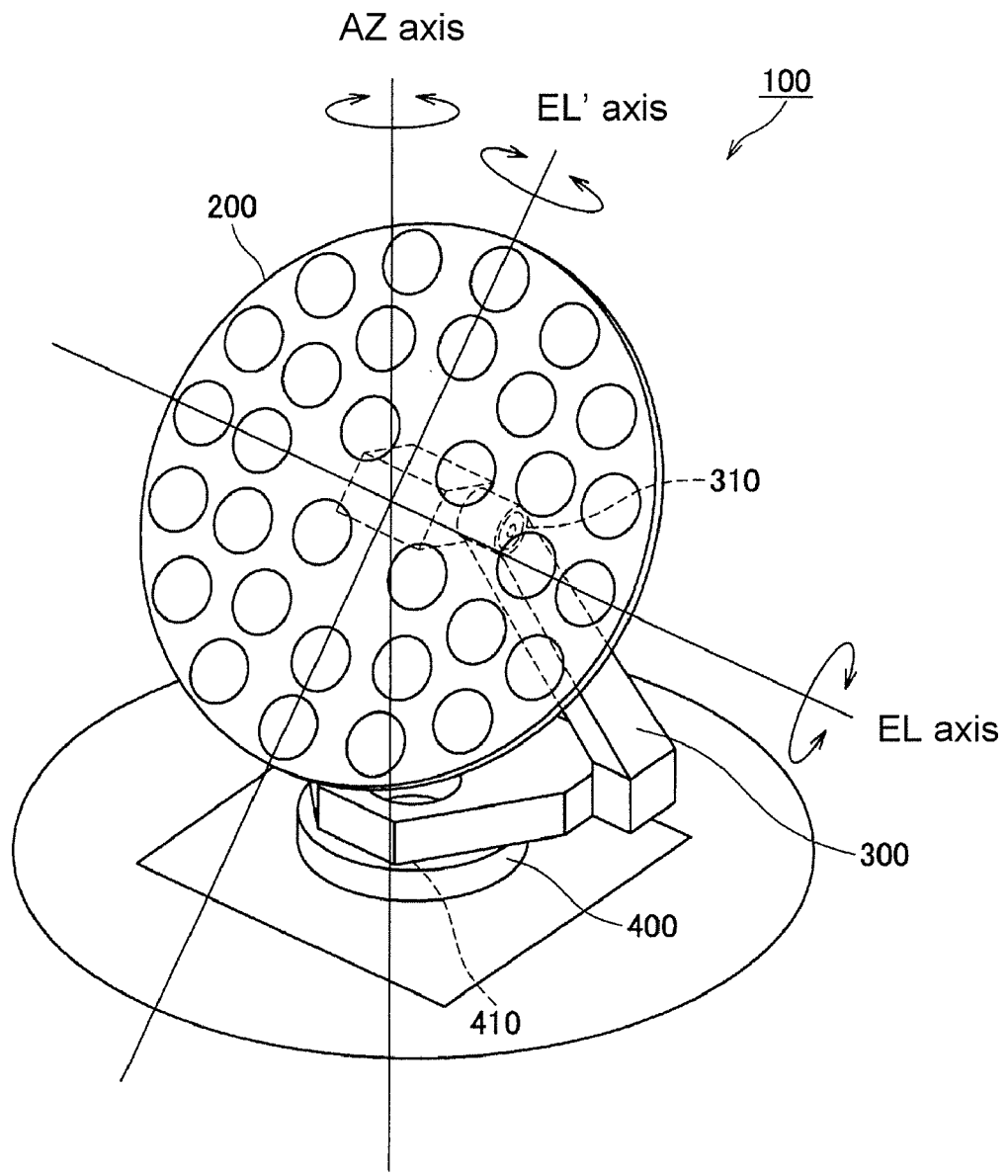
F I G. 1

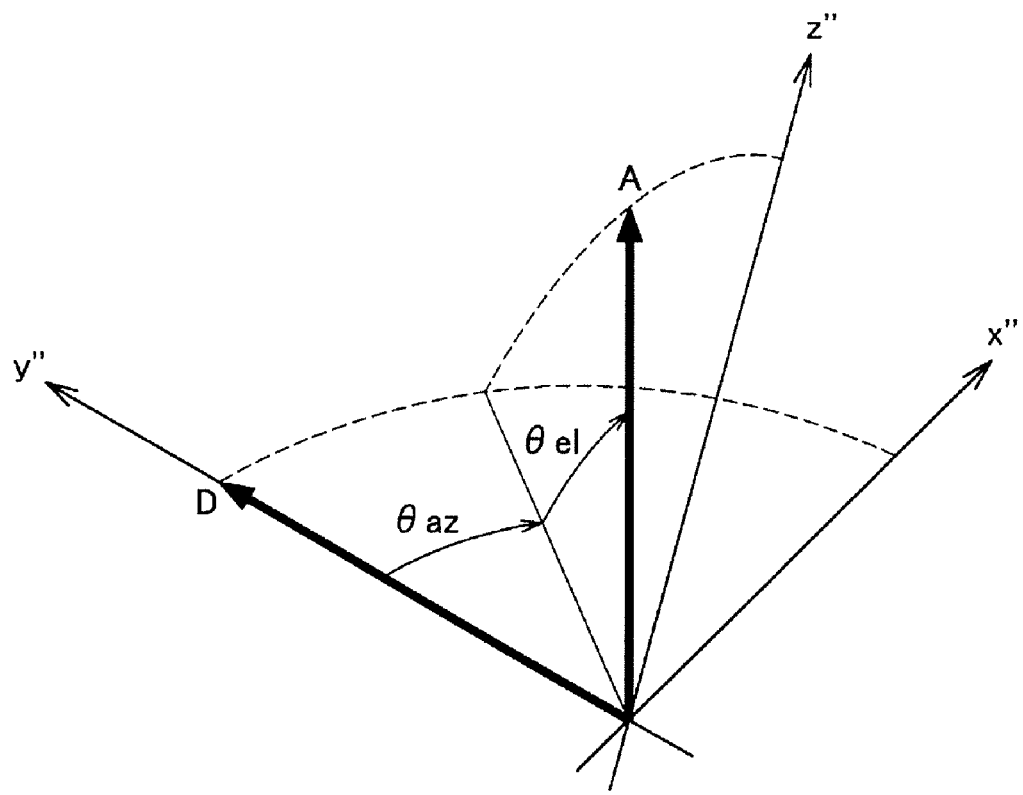
F I G. 5

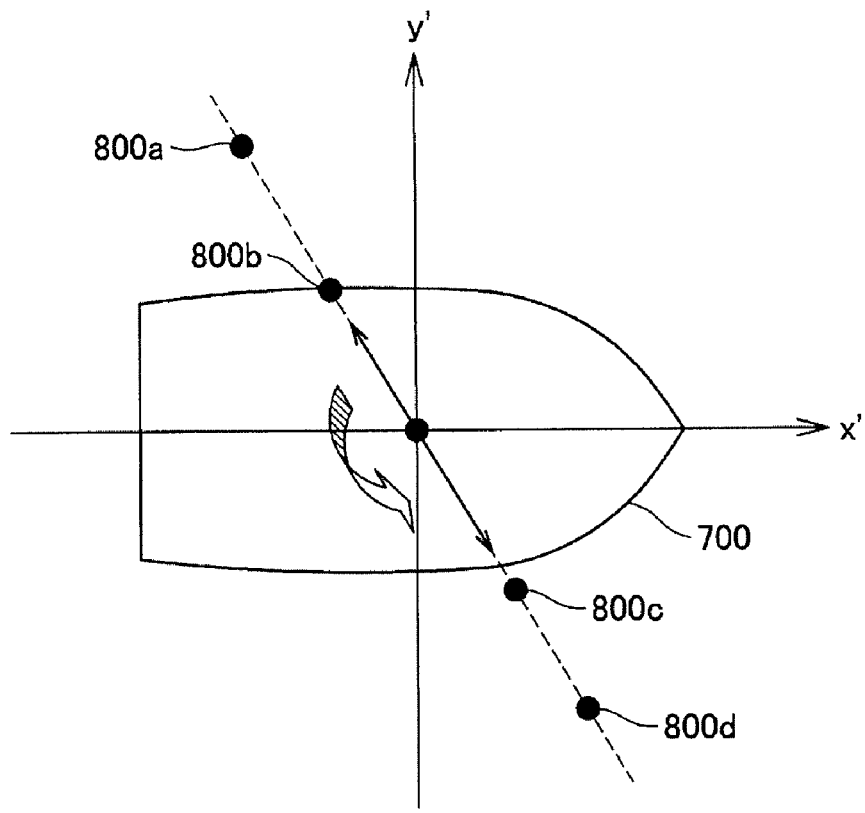
F I G. 6 (a)
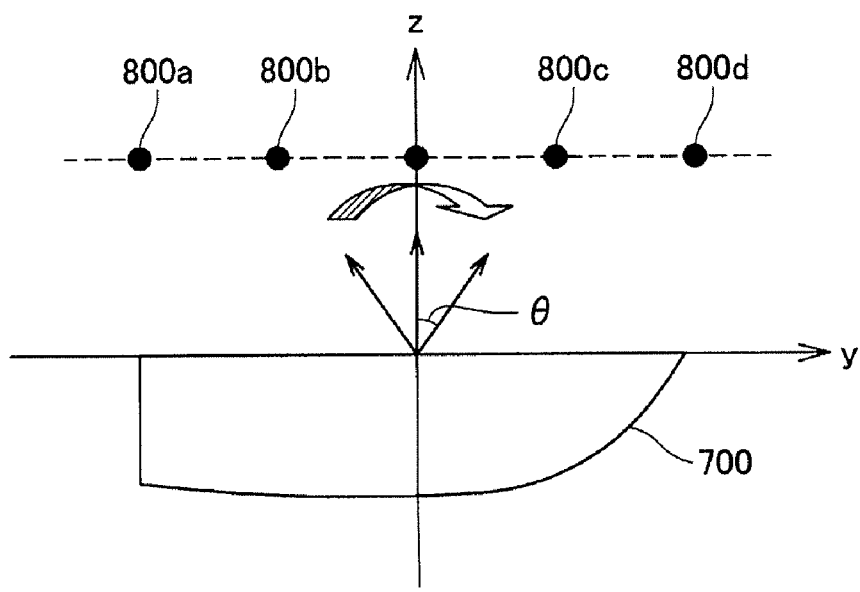
F I G. 6 (b)

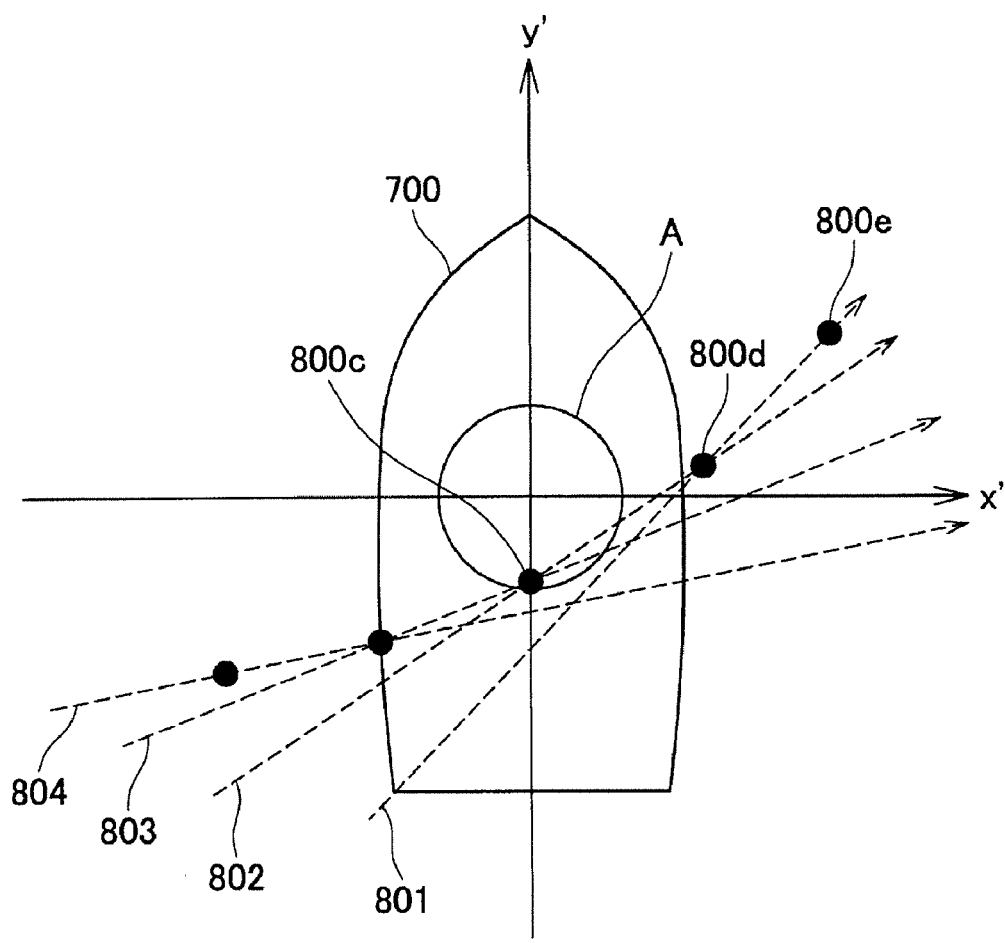
F I G. 7

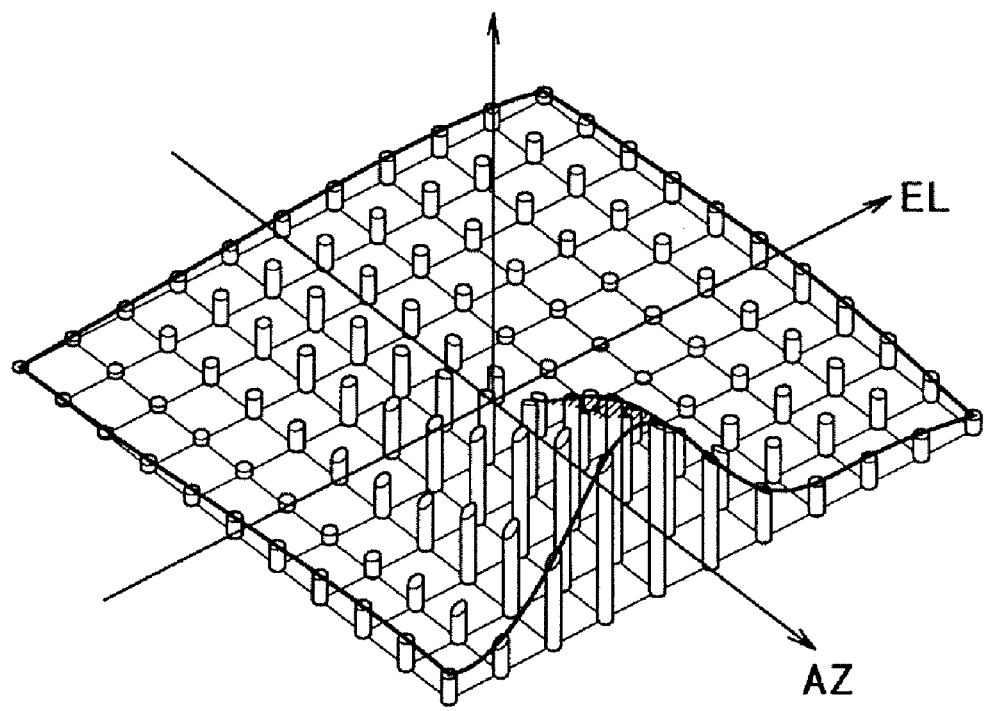
F I G. 10

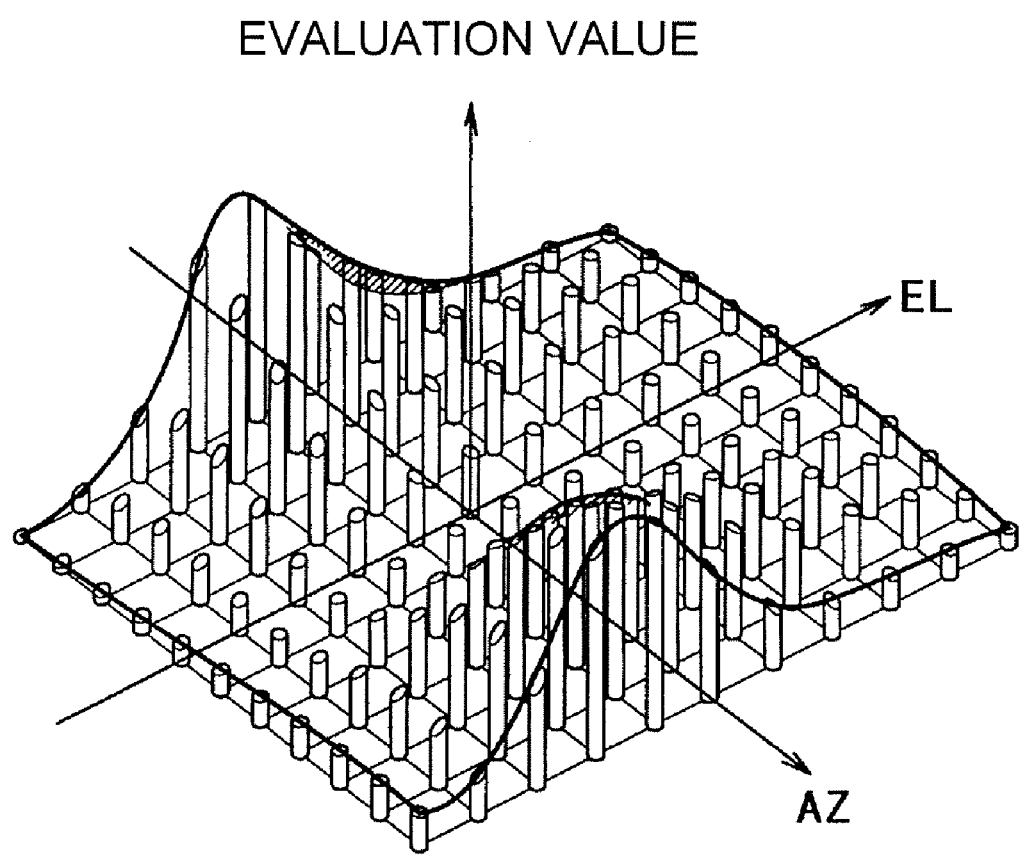
F I G. 11

CONTROL SYSTEM AND METHOD FOR REDUCING DIRECTIONAL ERROR OF ANTENNA WITH BIAXIAL GIMBAL STRUCTURE

BACKGROUND

1. Field of the Invention

The present invention relates to a control method for reducing a pointing error of an antenna having AZ (azimuth angle) axis and EL (elevation angle) axis gimbals and to a control apparatus that uses such a control method.

2. Background Information

In order for a mobile station, such as an airplane or a ship, to conduct communications, it is generally necessary for an antenna to be controlled so that it tracks a communication satellite even when the hull is rocking. Methods for tracking a communication satellite include methods that execute control using an antenna tracking mechanism having two axes, three axes, or four axes.

For example, a two-axis mechanism has a turning axis (hereinafter called AZ axis) that is a vertical axis about which the antenna can be turned through a full circle, and a rotation axis (hereinafter called EL axis) that is a horizontal axis about which the antenna can be tilted up and down. The two-axis mechanism is provided so that the antenna can be rotated about both axes independently.

While such a two-axis mechanism enables a simple antenna mechanism to be achieved, it is generally not capable of tracking when complex rocking occurs. In particular, when the satellite is on the AZ axis, the pointing error becomes extremely large. This pointing error is called a gimbal lock phenomenon and various research efforts are underway regarding this topic.

Japanese Laid-open Patent Publication No. H05-25972, for example, discloses an antenna pointing apparatus that can avoid the gimbal lock phenomenon and point an antenna at a satellite in a favorable manner even when the elevation angle of the satellite is near 90 degrees. The antenna pointing apparatus includes an antenna having a center axis X-X, a support mechanism that supports the antenna so that the antenna can be rotated about an elevation axis, an elevation gyroscope, and an azimuth gyroscope. The antenna pointing apparatus further includes a first accelerometer that detects a tilt angle of the center axis X-X with respect to a horizontal plane, a second accelerometer that detects a slant angle of the elevation axis with respect to the horizontal plane, an azimuth transmitter that detects a rotational angle of an azimuth gimbal about an azimuth axis, and an elevation transmitter that detects a rotational angle of the antenna about the elevation axis with respect to the azimuth gimbal. When the elevation angle of a satellite is in a region near 90 degrees, the apparatus controls the antenna such that the elevation axis is adjusted according to the direction of a tilt axis of a ship hull.

Japanese Laid-open Patent Publication No. H07-154127 discloses an antenna pointing apparatus that can point an antenna at a satellite in a favorable manner at all times, even when a ship hull is rocking or is statically tilted. The antenna pointing apparatus is provided with a tilt compensation computing section that computes a tilt compensation value, a rocking angle computing section that computes rocking angles of a mounting surface of the antenna pointing apparatus, and a gimballing error computing section that computes a gimballing error occurring in a bow directional angle based on a satellite bearing angle and the rocking angles supplied from the rocking angle computing section. An output signal from the gimballing error computing section is used to eliminate the gimballing error from the bow directional angle.

Japanese Laid-open Patent Publication No. H07-154128 discloses an antenna pointing apparatus that can point an antenna at a satellite in a favorable manner at all times, even when a rotational angle θ of the antenna about an elevation axis is close to 90 degrees. The antenna pointing apparatus includes a rocking angle computing section that computes rocking angles of a hull surface, a servo deviation compensation computing section that computes a detected angular velocity deviation between an elevation gyroscope and an azimuth gyroscope, an azimuth servo deviation limiter value computing section that computes an azimuth servo deviation limiter value, and a servo deviation limiter that limits an azimuth servo deviation. The apparatus is configured to prevent an azimuth servo motor from undergoing runaway even when a rotational angle of the antenna about the elevation axis is near 90 degrees.

Among conventional antenna pointing apparatuses having two-axis, three-axis, and four-axis mechanisms, those having three-axis mechanisms and those having four-axis mechanisms are more complex structurally, have a higher parts cost, and cannot be made smaller in size. Consequently, as exemplified in the documents cited above, various two-axis mechanisms have been developed with the objective of reducing size and weight.

However, with the antenna pointing apparatus disclosed in Japanese Laid-open Patent Publication No. H05-25972, the EL axis is "always" fixed in a longitudinal direction of the hull for the satellite near a zenith position. Consequently, it is not possible to satisfy the rocking standard generally required for a satellite communication ship earth station (e.g., an antenna pointing error of ±5 degrees at a pitch angle of 10 degrees and a roll angle of 30 degrees). In other words, the fixing causes the antenna pointing error to be ±10 degrees such that the pointing error does not satisfy the standard when severe rocking occurs.

With the antenna pointing apparatus disclosed in Japanese Laid-open Patent Publication No. H07-154127, it is difficult to accurately recognize rocking of the hull because the elevation gyroscope and the azimuth gyroscope are attached to the antenna. Furthermore, with the antenna pointing apparatus disclosed in Japanese Laid-open Patent Publication No. H07-154128, the computations take a large amount of time, and a large cost of processing is required because a directional angle (or an estimated directional angle) of the satellite is calculated based on an estimated rocking of the hull, and an output of the apparatus is determined based on an amount of difference between the calculated value and the rotation angle about the AZ axis.

SUMMARY

An object of the present invention is to provide an antenna pointing control apparatus and method that reduce a pointing error of an antenna having a two-axis gimbal structure using simple constituent features and a simple control.

Another object of the present invention is to provide an antenna pointing control apparatus and an antenna pointing control method that reduce a pointing error of an antenna having a two-axis gimbal structure to suppress an increase of the pointing error and maintain a durability of equipment.

Accordingly, an embodiment of the present invention provides an antenna pointing control apparatus that executes a pointing control so as to point a directional antenna installed on a mobile body toward a satellite using a two-axis mechanism. The apparatus includes a support member supporting the directional antenna rotatably about an elevation axis; a base pedestal supporting the directional antenna and the support member, with the base pedestal being rotatable about an azimuth axis; an elevation axis rotating means for rotationally driving the directional antenna about the elevation axis; and an azimuth axis rotating means for rotationally driving the directional antenna, the support member, and the base pedestal about the azimuth axis. The apparatus further includes a recording means for recognizing and recording movement and rocking of the mobile body once per prescribed cycle period; a measuring means for measuring a satellite bearing; an error detecting means for detecting a pointing error of the directional antenna based on a measurement result from the measuring means; and a determining means for determining whether or not a satellite will pass within a prescribed region about an extension line about the azimuth axis of the mobile body based on the measurement result from the measuring means and a record from the recording means. The determining means issues an instruction to control the elevation axis and the azimuth axis using a two-axis control in accordance with the pointing error from the error detecting means if the determining means determines that the satellite will not pass within the prescribed region about the extension line of the azimuth axis of the mobile body. Also, the determining means issues an instruction to operate the azimuth axis rotating means and the elevation axis rotation means based on a virtual three-axis control that assumes a virtual cross elevation axis exists, and controls the elevation axis and the azimuth axis in accordance with the pointing error from the error detecting means, if the determining means determines that the satellite will pass within the prescribed region about the extension line of the azimuth axis of the mobile body.

In addition, the antenna pointing control apparatus employs the two-axis mechanism to execute the pointing control to point the directional antenna installed on the mobile body toward the satellite. The two-axis structure is a mechanism that is rotatable about the elevation axis and the azimuth axis. Movement and rocking of the mobile body are recognized once per prescribed cycle period, and the satellite bearing is measured. The error detecting means detects the pointing error of the directional antenna with respect to the satellite. The determining means determines whether or not the satellite will pass within the prescribed region about the extension line of the azimuth axis of the mobile body. The two-axis control of the elevation axis and the azimuth axis is executed if it is determined that the satellite will not pass within the prescribed region about the extension line of the azimuth axis of the mobile body. The virtual three-axis control that assumes the virtual cross elevation axis exists and controls the elevation axis and the azimuth axis is executed if it is determined that the satellite will pass within the prescribed region about the extension line of the azimuth axis of the mobile body.

In this case, the pointing error of the antenna can be reduced by using a simple two-axis configuration and a simple control. More specifically, even in a situation where a gimbal lock phenomenon would occur, the control instructions with respect to the azimuth axis are divided by control instructions with respect to the virtual cross elevation axis due to execution of the virtual three-axis control. As a result, the control instructions to point the antenna toward the satellite are divided, and the azimuth axis can be prevented from repeatedly rotating 180 degrees at an unrestricted speed.

It is acceptable for the mobile body to be a ship. In such a case, the antenna can be pointed at the satellite using a simple configuration and a simple control even when the ship rocks due to waves. The prescribed region about the extension line of the azimuth axis is preferably a region within ±5 degrees relative to the extension line of the azimuth axis. In such a case, the antenna pointing error can be held to within ±5 degrees even if the mobile body reaches a pitch angle of 10 degrees. As a result, the antenna pointing standard can be reliably observed.

Another embodiment of the present invention provides an antenna attitude control method for executing a pointing control to point a directional antenna installed on a mobile body toward a satellite using a two-axis mechanism. The method includes a recording step for recording movement and rocking of the mobile body once per prescribed cycle period; a measuring step for measuring a satellite bearing; a step for detecting a pointing error of the directional antenna based on a measurement result; and a step for determining whether or not the satellite will pass through a prescribed region about an extension line of an azimuth axis of the mobile body based on a measurement result and a record of the mobile body. The method further includes a step for controlling an elevation axis and the azimuth axis using a two-axis control in accordance with the pointing error from an error detecting means if it is determined that the satellite is not within the prescribed region about the extension line of the azimuth axis of the mobile body, and a step for assuming that a virtual cross elevation axis exists and for controlling the elevation axis and the azimuth axis using a virtual three-axis control if it is determined that the satellite is within the prescribed region about the extension line of the azimuth axis of the mobile body.

With the antenna attitude control method, movement and rocking of the mobile body are recognized once every prescribed cycle time and the error detecting means detects the pointing error of the directional antenna with respect to the satellite. Also, a determination is made as to whether or not the satellite exists within the prescribed region about the extension line of the azimuth axis of the mobile body. If it is determined that the satellite is not within the prescribed region about the extension line of the azimuth axis of the mobile body, then the two-axis control that controls the elevation axis and the azimuth axis is executed. If it is determined that the satellite is within the prescribed region about the extension line of the azimuth axis of the mobile body, then the virtual three-axis control that assumes a virtual cross elevation axis exists and controls the elevation axis and the azimuth axis is executed.

In this case, the pointing error of the antenna can be reduced by using a simple two-axis configuration and a simple control. Additionally, even in a situation where gimbal lock phenomenon would occur, the control instructions with respect to the azimuth axis are divided by control instructions with respect to the virtual cross elevation axis due to execution of the virtual three-axis control. As a result, the control instructions to point the antenna toward the satellite are divided, and the azimuth axis can be prevented from repeatedly rotating 180 degrees at an unrestricted speed.

BRIEF DESCRIPTION OF THE DRAWINGS

FIG. 1 is a perspective view showing an external appearance of an antenna apparatus of a two-axis antenna pointing control apparatus according to an embodiment of the present invention;

FIG. 5 is a diagram illustrating a relationship between an antenna direction vector and the hull coordinate system;

FIGS. 6 (a) and (b) are diagrams for explaining a gimbal lock phenomenon;

FIG. 7 is another diagram for explaining another gimbal lock phenomenon;

FIG. 10 is an illustration of a distribution diagram of an evaluation value;

FIG. 11 is an illustration of another example of a distribution diagram of an evaluation value;

DETAILED DESCRIPTION OF EMBODIMENTS

Figure 2:
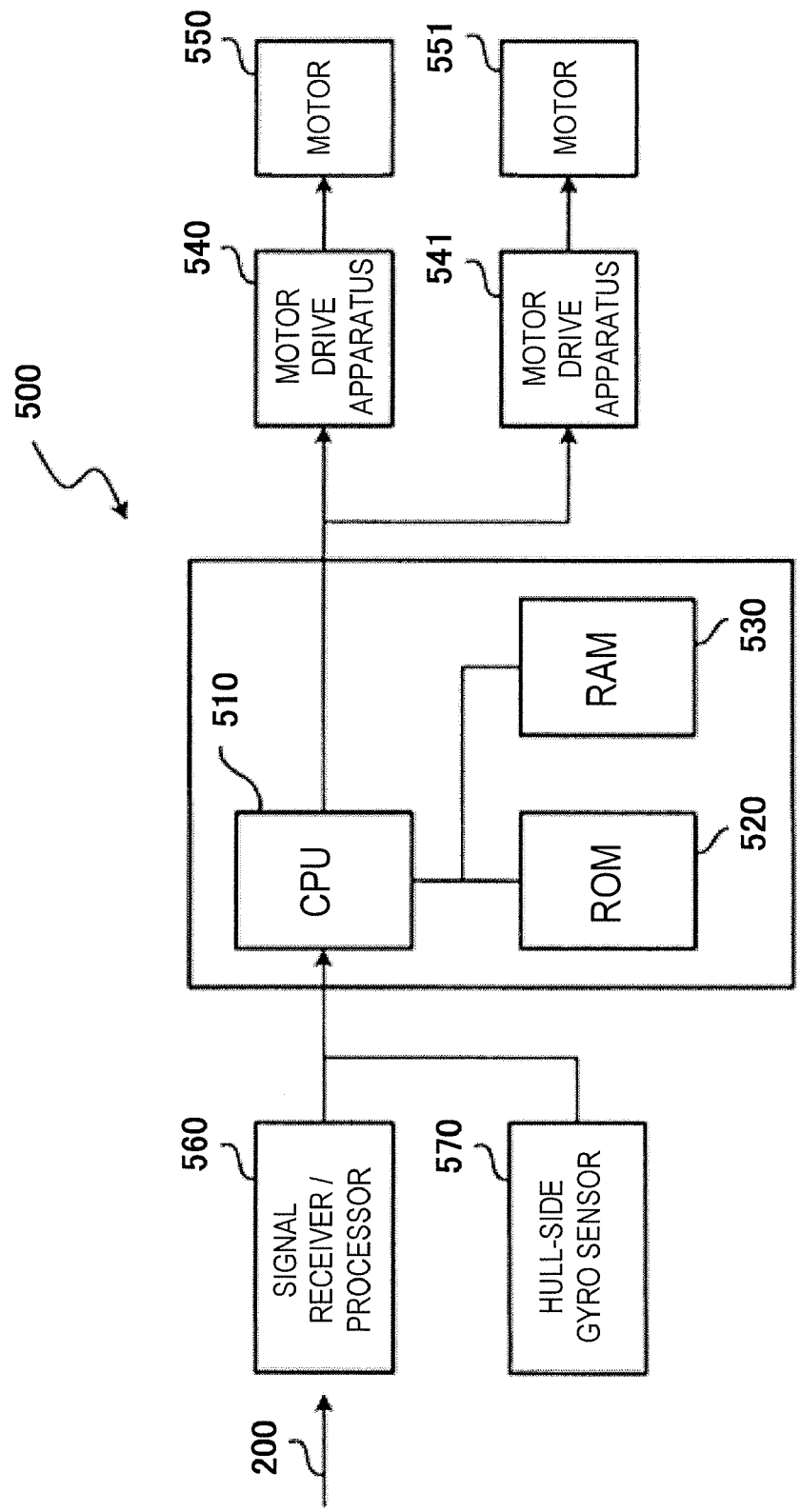
FIG. 2 is a block diagram showing internal components of the antenna pointing control apparatus shown in FIG. 1.

An embodiment of the present invention will now be explained. This embodiment relates to a case in which an antenna is pointed at a satellite using an antenna pointing control apparatus and an antenna pointing control method. However, the target need not be a satellite and the present invention can be applied to any other signal transmission source, such as a ship hull or a lighthouse.

FIG. 1 is a perspective view showing an example of an external appearance of an antenna apparatus of a two-axis antenna pointing control apparatus according to the present invention. As shown in FIG. 1, an antenna apparatus 100 includes an antenna 200, a support member 300, a rotary pedestal 400, and an antenna pointing control apparatus 500 (not shown).

A rotary drive apparatus 410 provided in the rotary pedestal 400 of the antenna apparatus 100 serves to move a pointing direction of the antenna 200 about an azimuth axis (hereinafter called "AZ axis") that extends in a vertical direction through a center of the antenna 200 of the antenna apparatus 100. A rotary drive apparatus 310 provided in a support portion of the support member 300 serves to move the pointing direction of the antenna 200 about an elevation axis (hereinafter called "EL axis") that extends in a vertical direction of the antenna 200. Also, in a control that will be explained later, it is assumed that a virtual cross elevation axis (hereinafter called "virtual EL axis") extending across the antenna 200 in a direction perpendicular to the EL axis virtually exists, although a rotary drive apparatus is not actually provided.

FIG. 2 is a block diagram showing an example of internal components of the antenna pointing control apparatus 500 shown in FIG. 1. As shown in FIG. 2, the antenna pointing control apparatus 500 includes a central processing unit (hereinafter called "CPU"), a ROM (read only memory) 520, a RAM (random access memory) 530, motor drive apparatuses 540 and 541, motors 550 and 551, signal receiver/processor 560, and a hull-side gyro sensor 570.

The CPU 510 of the antenna pointing control apparatus 500 receives a reception signal received by the antenna 200 from the signal receiver/processor 560 and a detection signal from the hull-side gyro sensor 570. Following a control program stored in the ROM 520, the CPU 510 issues instructions to the motor drive apparatuses 540 and 541 based on the reception signal and the detection signal. The motor drive apparatus 540 rotates the antenna 200 about the AZ axis by driving the motor 550 based on the instruction from the CPU 510, and the motor drive apparatus 541 rotates the antenna 200 about the EL axis by driving the motor 551 based on the instruction from the CPU 510.

Also, the CPU 510 stores data processed at the same time in the RAM 530 or another storage device. As a result, history data can be outputted or displayed on a display device (not shown).

With these arrangements as explained above, the antenna 200 of the antenna apparatus 100 is controlled so that the antenna 200 points to a satellite 800 in an appropriate fashion. The antenna pointing control method executed by the antenna apparatus 100 according to an embodiment of the present invention will now be explained in more detail.

Figure 3:
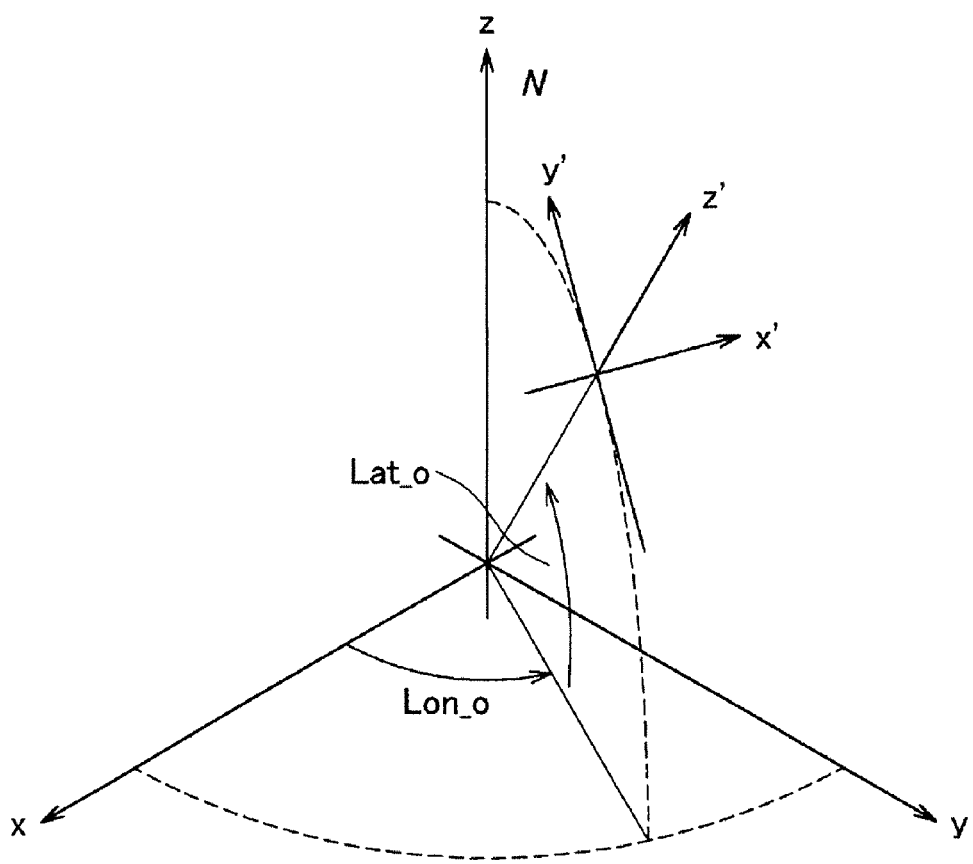
FIG. 3 is a diagram illustrating a relationship between an earth coordinate system and a horizontal coordinate system.

The definitions of parameters used in the antenna pointing control will now be explained with reference to FIGS. 3 to 5. FIG. 3 is a diagram illustrating a relationship between an earth coordinate system and a horizontal coordinate system. The earth coordinate system shown in FIG. 3 is a coordinate system centered on the earth, and the horizontal coordinate system is a coordinate system oriented such that a northward direction is located at 0 degrees from an observation point on a mobile body.

Figure 4:
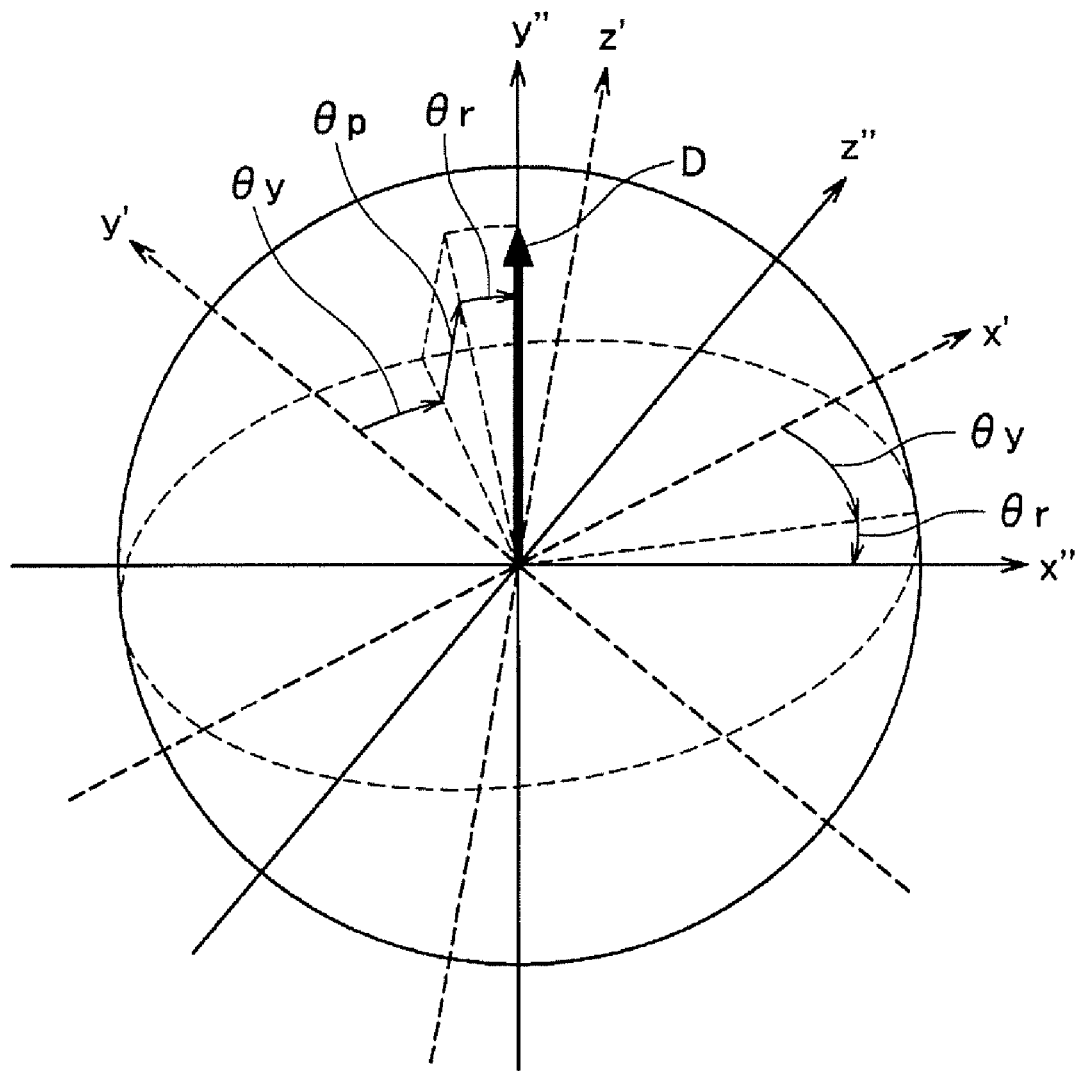
FIG. 4 is a diagram illustrating a relationship between the horizontal coordinate system and a hull coordinate system.

FIG. 4 is a diagram illustrating a relationship between the horizontal coordinate system and a ship hull coordinate system. The ship hull coordinate system shown in FIG. 4 is oriented such that a direction of a bow of a mobile body corresponds to 0 degrees. FIG. 5 is a diagram illustrating a relationship between an antenna direction vector and the ship hull coordinate system.

To explain the relationships among FIGS. 3 to 5, parameters below are set. A position vector in the earth coordinate system is expressed as position vector $S=(X\_S, Y\_S, Z\_S)$, a latitude of the satellite position is expressed as latitude $Lat\_s$, a longitude of the satellite position is expressed as longitude $Lon\_s$, and a distance from a center of the earth to the satellite is given as distance $R\_s$.

A latitude of an observation point position is expressed as $Lat\_O$ and a longitude of the observation point position is expressed as $Lon\_O$. A position vector in the earth coordinate system is expressed as position vector $O=(x\_o, y\_o, z\_o)$, and a distance from a center of the earth to a ship is expressed as distance $R\_o$ (=R: radius of earth).

A direction vector pointing toward the satellite from the observation point is expressed as direction vector $S'=(x\_s', y\_s', z\_s')$, and the distance from the observation point to the satellite is expressed as distance $R\_s$. Here, using the distance $R\_s$ from the observation point to the satellite, the direction vector pointing from the observation point to the satellite can be expressed as $x\_s'=(x\_s-x\_o)/R\_s$, $y\_s'=(y\_s-y\_o)/R\_s$, and $z\_s'=(z\_s-z\_o)/R\_s$.

The attitude of the ship hull constituting the mobile body is expressed in terms of ship hull attitude angles, namely a pitch angle $\theta p$, a roll angle $\theta r$, and a yaw angle $\theta y$, and a bow direction vector of the ship hull constituting the mobile body is expressed with D. An antenna azimuth angle is expressed with $\theta az$, an elevation angle of the antenna attitude is expressed with $\theta el$, and an antenna direction vector is expressed with A.

A conversion equation for converting from the earth coordinate system to the horizontal coordinate system using the parameters described above is expressed as shown below.

$$Rz(90°)Ry(90° - \text{Lat\_o})Rz(\text{Lon\_o}) = \quad [\text{Equation 1}]$$

$$\begin{pmatrix} 0 & 1 & 0 \\ -1 & 0 & 0 \\ 0 & 0 & 1 \end{pmatrix} \begin{pmatrix} \sin(\text{Lat\_o}) & 0 & -\cos(\text{Lat\_o}) \\ 0 & 1 & 0 \\ \cos(\text{Lat\_o}) & 0 & \sin(\text{Lat\_o}) \end{pmatrix}$$

$$\begin{pmatrix} \cos(\text{Lon\_o}) & \sin(\text{Lon\_o}) & 0 \\ -\sin(\text{Lon\_o}) & \cos(\text{Lon\_o}) & 0 \\ 0 & 0 & 1 \end{pmatrix}$$

A calculation equation of the satellite direction vector in the earth coordinate system is expressed as shown below.

$$S = Rz(90°)Ry(90° - \text{Lat\_o})Rz(\text{Lon\_o}) \begin{pmatrix} x\_s' \\ y\_s' \\ z\_s' \end{pmatrix} \quad [\text{Equation 2}]$$

$$= \begin{pmatrix} 0 & 1 & 0 \\ -1 & 0 & 0 \\ 0 & 0 & 1 \end{pmatrix} \begin{pmatrix} \sin(\text{Lat\_o}) & 0 & -\cos(\text{Lat\_o}) \\ 0 & 1 & 0 \\ \cos(\text{Lat\_o}) & 0 & \sin(\text{Lat\_o}) \end{pmatrix}$$

$$\begin{pmatrix} \cos(\text{Lon\_o}) & \sin(\text{Lon\_o}) & 0 \\ -\sin(\text{Lon\_o}) & \cos(\text{Lon\_o}) & 0 \\ 0 & 0 & 1 \end{pmatrix} \begin{pmatrix} x\_s' \\ y\_s' \\ z\_s' \end{pmatrix}$$

A coordinate conversion equation for converting from the ship hull coordinate system to the horizontal coordinate system is expressed as shown below.

$$Rx(\theta_p)Ry(\theta_r)Rz(-\theta_y) = \begin{pmatrix} 1 & 0 & 0 \\ 0 & \cos\theta_p & \sin\theta_p \\ 0 & -\sin\theta_p & \cos\theta_p \end{pmatrix} \quad [\text{Equation 3}]$$

$$\begin{pmatrix} \cos\theta_r & 0 & -\sin\theta_r \\ 0 & 1 & 0 \\ \sin\theta_r & 0 & \cos\theta_r \end{pmatrix} \begin{pmatrix} \cos\theta_y & -\sin\theta_y & 0 \\ \sin\theta_y & \cos\theta_y & 0 \\ 0 & 0 & 1 \end{pmatrix}$$

A calculation equation of the antenna direction vector in the earth coordinate system is expressed as shown below $$A = Rx(\theta_p)Ry(\theta_r)Rz(-\theta_y)\left(Rz(\theta_{az})Rx(-\theta_{el})\begin{pmatrix} 0 \\ 1 \\ 0 \end{pmatrix}\right) \quad [\text{Equation 4}]$$

$$= \begin{pmatrix} 1 & 0 & 0 \\ 0 & \cos\theta_p & \sin\theta_p \\ 0 & -\sin\theta_p & \cos\theta_p \end{pmatrix} \begin{pmatrix} \cos\theta_r & 0 & -\sin\theta_r \\ 0 & 1 & 0 \\ \sin\theta_r & 0 & \cos\theta_r \end{pmatrix}$$

$$\begin{pmatrix} \cos\theta_y & -\sin\theta_y & 0 \\ \sin\theta_y & \cos\theta_y & 0 \\ 0 & 0 & 1 \end{pmatrix}$$

$$\left(\begin{pmatrix} \cos\theta_{az} & \sin\theta_{az} & 0 \\ -\sin\theta_{az} & \cos\theta_{az} & 0 \\ 0 & 0 & 1 \end{pmatrix} \begin{pmatrix} 1 & 0 & 0 \\ 0 & \cos\theta_{el} & -\sin\theta_{el} \\ 0 & \sin\theta_{el} & \cos\theta_{el} \end{pmatrix} \begin{pmatrix} 0 \\ 1 \\ 0 \end{pmatrix}\right)$$

The equations shown above are stored in the ROM 520 of the antenna pointing control apparatus 500 in advance, and the CPU 510 uses the equations to calculate the antenna direction vector for pointing the antenna 200 toward the satellite 800.

In this embodiment, pulse motors are used as the motors 550 and 551 for driving the antenna 200. Thus, a drive angle of each of the motors 550 and 551 can be calculated by counting a number of pulses. An excitation force of the pulse motors is a sufficient excitation force to hold the antenna 200.

Regarding driving the motor 550, a conventional control executes rotational movement from 0 degree to 90 degrees such that the antenna 200 changes from a horizontal state to a vertical state, but a control according to this embodiment executes rotational movement from 0 degree to 150 degrees. This rotational movement is not limited to from 0 to 150 degrees, but rather, any angles are acceptable, e.g., it is acceptable to use from 0 to 120 degrees.

The motors 550 and 551 are driven by the CPU 510 through the motor drive apparatuses 540 and 541 with a pulse count proportional to a drive angle.

Acceleration of Motor 550 =      [Equation 5]

{289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 289, 286, 283, 280, 277, 274, 271, 268, 265, 262, 259, 256, 253, 250, 247, 244, 241, 238, 235, 232, 229, 226, 223, 220, 217, 214, 211, 208, 205, 202, 199, 196, 193, 190, 187, 184, 181, 178, 175, 172, 170, 168, 166, 164, 162, 160, 158, 156, 154, 152, 50, 148, 146, 144, 142, 140, 138, 136, 134, 132, 132, 130, 128, 126, 124, 122, 120, 118, 116, 114, 112, 110, 108, 106, 105, 104, 103, 102, 101, 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 20, 20, 20, 20, 20, 20, 19, 19, 19, 19, 19, 19, 19, 19, 19, 19, 19, 19, 19, 19, 19, 19, 19, 19, 19, 19, 18, 18, 18, 18, 18, 18, 18, 18, 18, 18,}

A gimbal lock phenomenon that occurs in the antenna pointing control apparatus 100 according to an embodiment of the present invention will now be explained.

FIGS. 6 (*a*) and (*b*) are diagrams for explaining the gimbal lock phenomenon. FIG. 6 (*a*) shows a ship hull as seen from a satellite and FIG. 6 (*b*) is a diagram illustrating a relationship between the satellite and the ship hull as seen from a side of the ship hull. In FIGS. 6 (*a*) and (*b*), the ship hull 700 is assumed to be moving in a bow direction. The relationship with respect to the ship hull 700 is such that the relative motion of the satellite 800 is in the order satellite 800*a*, satellite 800*b*, satellite 800*c*, and satellite 800*d*.

When the satellite 800 exists on an extension line of the AZ axis of the ship hull 700, i.e., when the satellite 700 exists in a zenith direction of the ship hull 700, it becomes necessary for the antenna pointing control apparatus 500 having the two-axis mechanism to rotate the motor 550 by 180 degrees about the AZ axis at an unrestricted speed. In other words, immediately after the satellite 800 passes through the extension line of the azimuth AZ, an unrestricted rotational speed is required in order for the antenna 200 to be pointed at the satellite 800. Particularly in the case of the ship hull 700, the antenna pointing control apparatus 500 rotates the motor 550 by 180 degrees about the AZ axis at an unrestricted speed multiple times because waves on the water surface cause rocking and the satellite 800 passes over and returns repeatedly.

The gimbal lock phenomenon does not only occur when the satellite 800 exists on the extension line of the AZ axis of the ship hull 700, but also occurs when the satellite 800 exists near the extension line of the AZ axis of the ship hull 700. As shown in FIG. 7, the gimbal lock phenomenon not only occurs when the satellite 800 passes through the extension line of the AZ axis of the ship hull 700 but also occurs when the satellite 800 passes within a prescribed region relative to the extension line of the AZ axis of the ship hull 700.

In this embodiment, the region A shown in FIG. 7 is a region in which there is a high possibility that the gimbal lock phenomenon will occur, i.e., a region having an angle θ (see FIG. 6 (*b*)) of ±5 degrees with respect to the AZ axis of the ship hull 700 or, in other words, a region defined by a boundary extending from a point on the AZ axis at an angle θ of ±5 degrees. Although in this embodiment the region A shown in FIG. 7 is a region of ±5 degrees, the invention is not limited to this and it is acceptable to set the region A to any other angle θ, e.g., ±10 degrees. The gimbal lock phenomenon also occurs when, as shown in FIG. 7, the motions of the satellite move in the order from satellite 800*a* to 800*d* due to the movement of the ship hull 700.

Next, an example of the control program stored in the ROM 510 of the antenna pointing control apparatus 500 will be explained.

Figure 8:
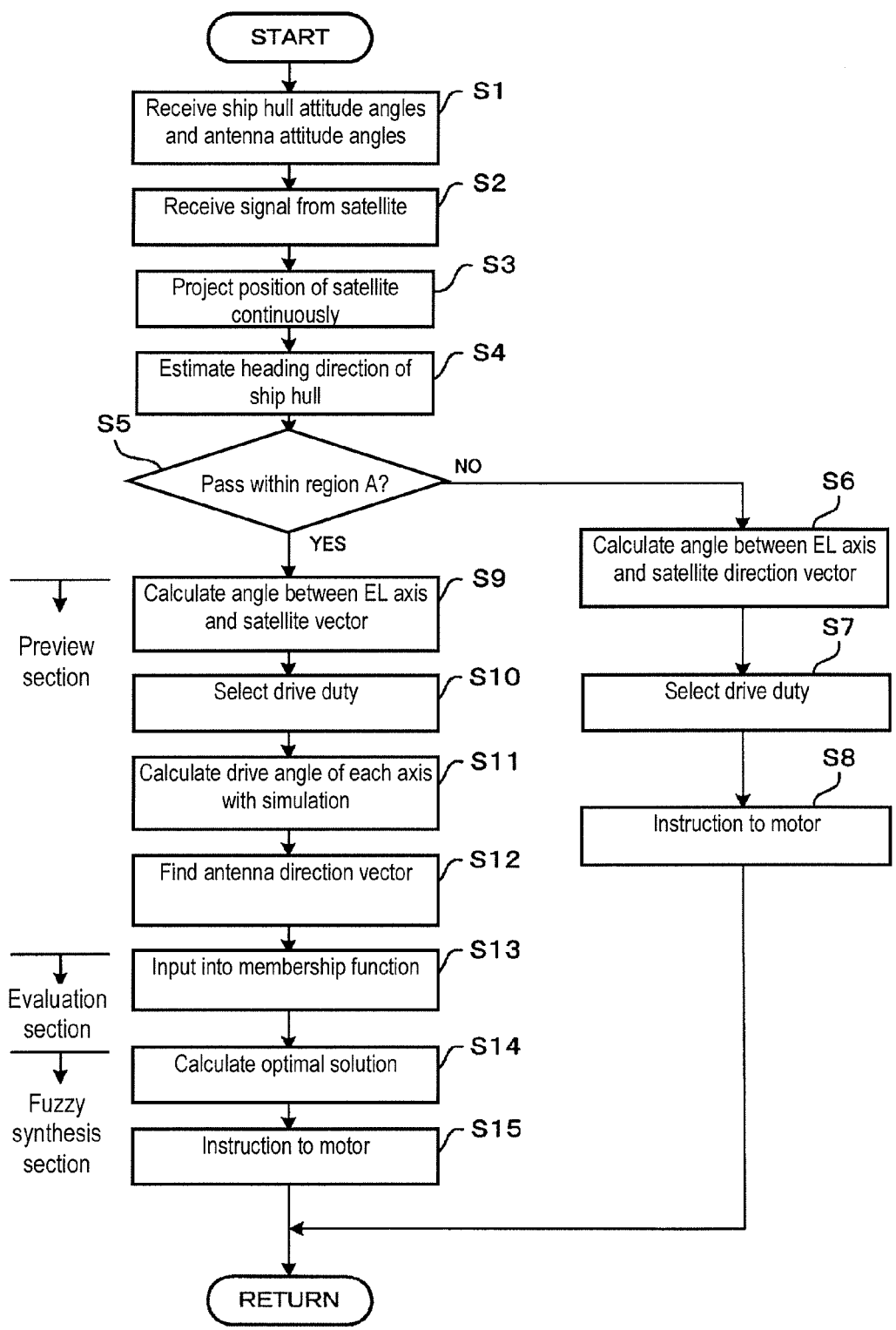
FIG. 8 is a flowchart showing an example of a control flow of the antenna pointing control apparatus according to an embodiment of the present invention.

FIG. 8 is a flowchart showing an example of a control flow of the antenna pointing control apparatus 500 according to the present invention. First, a summary of the flow executed by the CPU 510 of the antenna pointing control apparatus 500 will be explained, and, afterwards, the steps will be explained in detail.

The CPU 510 receives the attitude angles (θp, θr, θy) of the ship hull from the hull-side gyro sensor 570 provided on the ship hull 700 (step S1). The CPU 510 then receives a signal from the satellite 800 from the signal receiver/processor 560 (step S2). The satellite 800 is constantly emitting a signal, and the CPU 510 is constantly receiving a signal from the signal receiver/processor 560 through the antenna 200. Based on the received signal, the CPU 510 continuously projects a position of the satellite 800 (step S3).

Since the projection onto the ship hull 700 is continuously and repeatedly calculated for a short amount of time, even if the ship hull 700 is stirred by a wave, a predicted path of the satellite 800 can be calculated reliably in a next moment. By calculating not only for a short amount of time but for a short amount of time and a long amount of time, external disturbances caused by sensor sensitivity can be removed and a reliable control can be accomplished. Also, instead of only calculating a predicted path of the satellite 800 based on a relationship between the satellite 800 and the ship hull 700, it is acceptable to include a steering of a steering apparatus of the ship hull 700 or a drive state of a propulsion apparatus as prediction parameters when calculating a predicted path of the satellite 800.

Next, the CPU 510 determines whether or not the satellite 800 will pass through the AZ axis of the ship hull 700 (within the region A) (step S5). In this embodiment, the CPU 510 determines whether or not the satellite 800 will pass within the region A of ±5 degrees relative to the AZ axis of the ship hull 700. If it is determined that the satellite 800 will pass within the region A of ±5 degrees relative to the AZ axis of the ship hull 700, then the CPU 510 executes a virtual three-axis control that will be explained later. Meanwhile, if it is determined that the satellite 800 will not pass within the region A of ±5 degrees relative to the AZ axis of the ship hull 700, then the CPU 510 executes a two-axis control. A drive pattern of a drive duty for this embodiment is shown below.

TABLE 1

Drive patterns

| | | |
|---|---|---|
| DutyAz = −Duty | DutyAz = 0 | DutyAz = +Duty |
| DutyEl = +Duty | DutyEl = +Duty | DutyEl = +Duty |
| DutyAz = −Duty | DutyAz = 0 | DutyAz = +Duty |
| DutyEl = 0 | DutyEl = 0 | DutyEl = 0 |
| DutyAz = −Duty | DutyAz = 0 | DutyAz = +Duty |
| DutyEl = −Duty | DutyEl = −Duty | DutyEl = −Duty |

The CPU 510 selects one drive duty among those shown in Table 1 and drives the motor 550 and 551 through the motor drive control apparatuses 540 and 541 (step S8). As a result, the antenna 200 rotates about the AZ axis and the EL axis, and the antenna direction vector becomes 0.

The CPU 510, in a preview section, calculates an angle formed between the EL axis and a satellite direction vector (step S9). The CPU 510 then selects a drive duty based on the calculated angle between the EL axis and the satellite direction vector (step S10). A drive pattern of the drive duty is similar to Table 1. In this embodiment, as drive duties for simulation, eleven patterns at 3600 pps steps are set in a range of −1800 to +1800 with respect to the AZ axis, eleven patterns at 2000 pps steps are set in a range of −1000 to +1000 with respect to the EL axis, and eleven patterns at 2000 pps steps are set in a range of −1000 to +1000 with respect to the EL' axis.

The CPU 510 then conducts a simulation of the motors 550 and 551 using the selected drive duty and calculates a drive angle (θaz and θel) for each of the axes (step S11). Next, the CPU 510 finds an antenna direction vector using the calculated drive angles (θaz and θel) and the detected ship hull attitude angles (θp, θr, and θy) (step S12). Then, the CPU 510 calculates an angle between the found antenna direction vector and the satellite direction vector (difference between the antenna direction vector and the satellite direction vector, hereinafter called "pointing error") and provides the angle to an evaluating section. At the evaluating section, the CPU 510 puts the pointing error provided from the preview section into a preset membership function (step S13).

Figure 9:
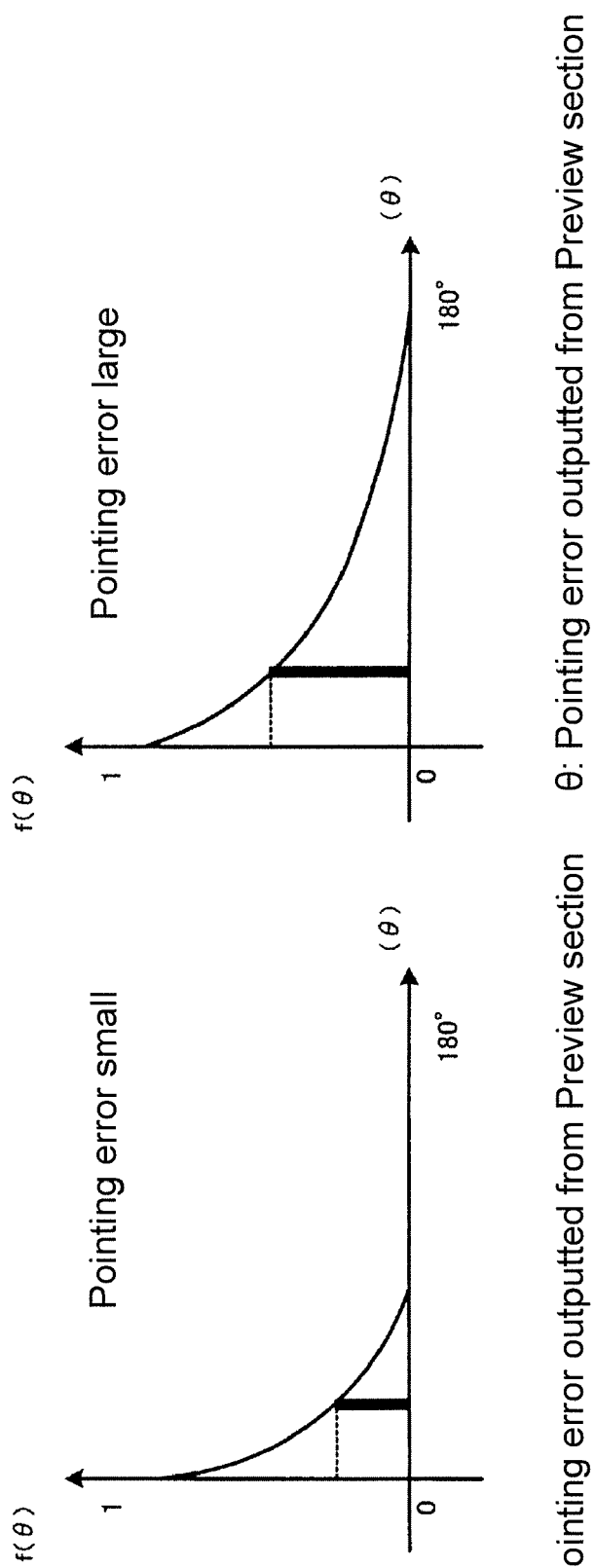
FIGS. 9 (a) and (b) show specific examples of a membership function.

FIGS. 9 (*a*) and (*b*) show a specific example of a membership function. As shown in FIGS. 9 (*a*) and (*b*), the membership function is variable in this embodiment. FIG. 9 (*a*) shows a case in which the pointing error is a small value, and FIG. 9 (*b*) shows a case in which the pointing error is a large value.

These membership functions are functions that output an evaluation value from 0 to 1 with respect to the inputted pointing error. That is, by varying the membership function according to the pointing error, an insufficient output to the motor can be prevented from ultimately occurring when the pointing error is large, and an excessive output to the motor can be prevented from ultimately occurring when the pointing error is small.

FIG. 10 is an illustration of a distribution diagram of the evaluation value. In FIG. 10, the evaluation is high for driving by a large amount in a positive (+) direction in the AL axis direction and by a little in a negative (−) direction in the EL axis direction. If the evaluation is high, the pointing error can be controlled to near 0.

FIG. 11 is an illustration of another example of a distribution diagram of the evaluation value. In FIG. 11, unlike FIG. 10, the evaluation is high in two locations. Specifically, the evaluation is high for driving by a comparatively large amount in the positive (+) direction in the AL axis direction and by a comparatively small amount in the negative (−) direction in the EL axis direction, and the evaluation is high for driving by a comparatively large amount in the negative (−) direction in the AL axis direction and by a comparatively small amount in the negative (−) direction in the EL axis direction.

Regarding driving with respect to the EL axis, there is not a problem regarding determining the control output with respect to the EL axis because the evaluation becomes high by driving by a comparatively small amount in the negative (−) direction in both cases. However, regarding the determination of the control output with respect to the AL axis, canceling out occurs in a fuzzy synthesis section and a state in which the motor is not driven by the control output occurs because the drive directions are completely opposite, i.e., positive (+) direction and negative (−) direction.

In such a case, the CPU 510 conducts an extraction of a nearby layer and stores a point where the evaluation value is maximum when an evaluation is conducted in the RAM 530. Then, the fuzzy synthesis section that is explained later conducts synthesis only in a vicinity of the point where the evaluation value is maximum. As a result, even when there is a plurality of points where the evaluation value is high, the motor can be driven in a direction where the evaluation is maximum.

Figure 12:
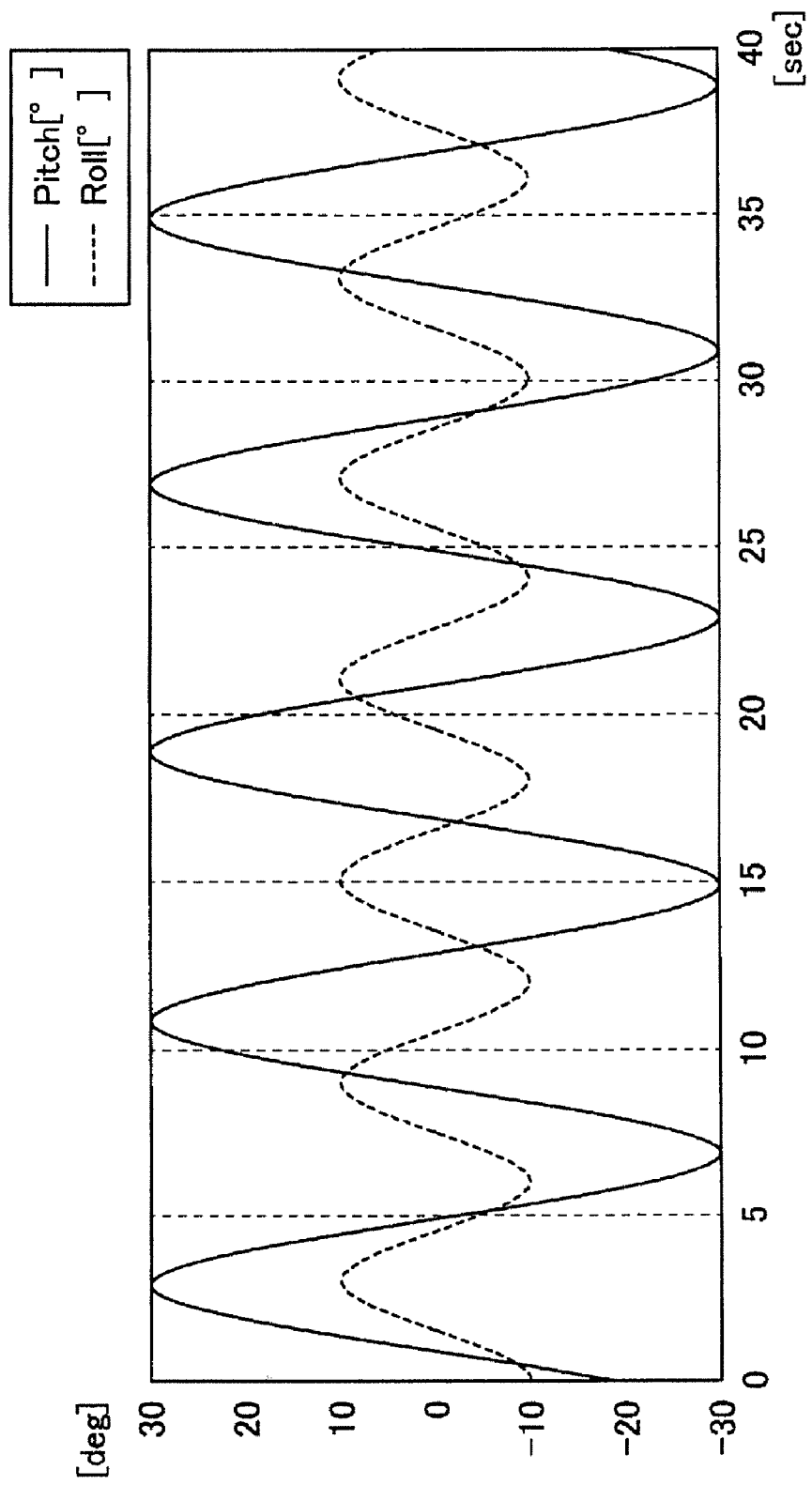
FIG. 12 is a plot illustrating pitch and roll of a hull 700.
Figure 13:
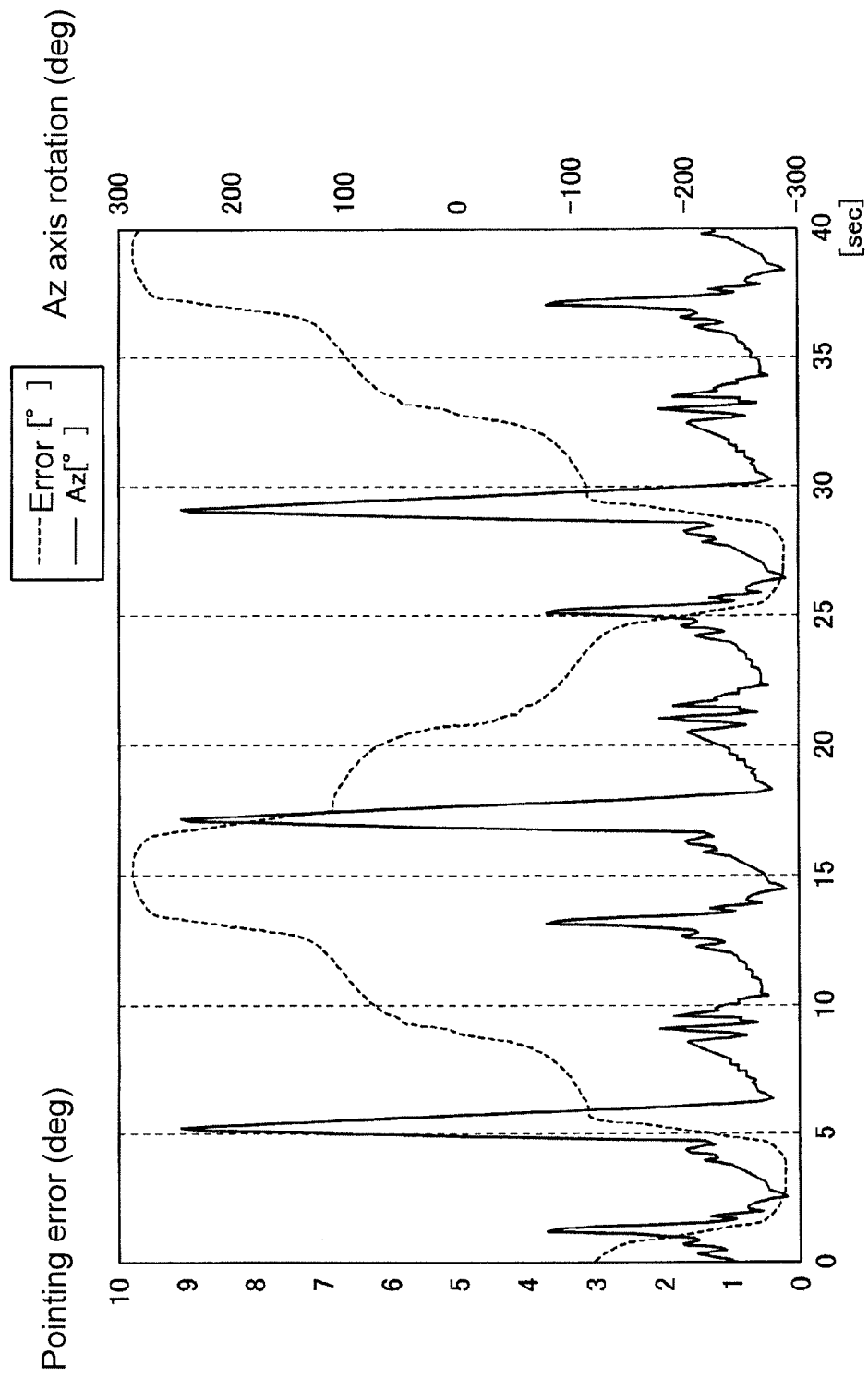
FIG. 13 illustrates an example of a result of a two-axis control executed when the pitch and roll illustrated in FIG. 12 occurs.
Figure 14:
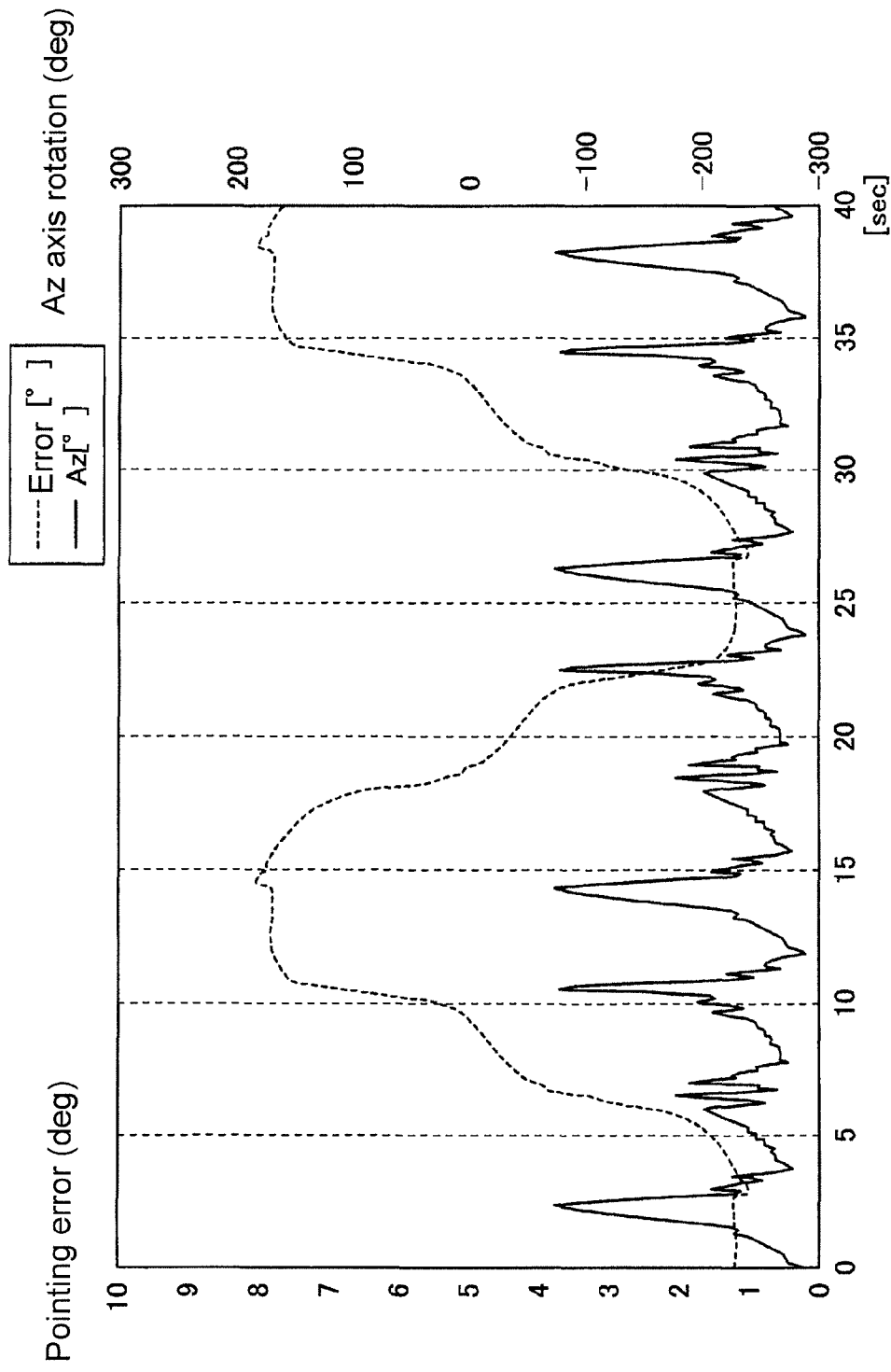
FIG. 14 illustrates an example of a result of a virtual three-axis control executed when the pitch and roll illustrated in FIG. 12 occurs.

FIGS. 12, 13, and 14 show results of simulations for explaining an effect of a virtual three-axis control. FIG. 12 shows pitch and roll experienced by the ship hull 700, FIG. 13 shows a result of a two-axis control executed when the pitch and roll shown in FIG. 12 occurs, and FIG. 14 shows a result of a virtual three-axis control executed when the pitch and roll shown in FIG. 12 occurs.

In FIG. 12, the pitch (degrees) is indicated with a solid line, and the roll (degrees) is indicated with a broken line. Thus, in the simulation, the ship hull 700 undergoes pitching of ±30 degrees and rolling of ±10 degrees. In FIG. 13 and FIG. 14, the solid line indicates rotation (deg) of the AZ axis and the broken line indicates the pointing error (deg).

In FIG. 13, the AZ rotational axis is varying rapidly while in FIG. 14, the AZ rotational axis is not varying rapidly. More specifically, in FIG. 13, the rotation about the AZ axis is varying in a range of ±300, and in FIG. 14, it is varying in a range of −100 to −300. Thus, since the control scheme of the virtual three-axis control does not incur rotation about the AZ axis at an unrestricted speed, the pointing error indicated as error becomes lower than for the two-axis control.

Based on the above, the pointing error of the antenna 200 can be reliably reduced by using a simple two-axis structure and a simple control. More specifically, even in a situation where the gimbal lock phenomenon would occur, the control instructions with respect to the AZ axis are divided by control instructions with respect to the virtual cross elevation axis by executing the virtual three-axis control. As a result, the control instructions to point the antenna 200 toward the satellite 800 are divided, and the AZ axis can be prevented from repeatedly rotating 180 degrees at an unrestricted speed, i.e., the so-called gimbal lock phenomenon can be prevented.

In the embodiment explained above, the ship hull 700 corresponds to a mobile body, the antenna 200 corresponds to a directional antenna and a measuring means, the bearing of the antenna 800 corresponds to a satellite bearing, the antenna apparatus 100 corresponds to an antenna apparatus, and the support member 300 corresponds to a support member. Also, the rotary pedestal 400 corresponds to a base pedestal, the motor drive control apparatus 540 and the motor 550 correspond to an azimuth axis rotating means, the motor drive control apparatus 541 and the motor 551 correspond to an elevation axis rotating means, the ROM 520 or the RAM 530 corresponds to a recording means, the CPU 510 corresponds to an error detecting means and a determining means, and the region A corresponds to a prescribed region.

As can be appreciated from the above, the embodiment of the present invention applies to a control method for reducing a pointing error of an antenna having a gimbal structure with an AZ (azimuth angle) axis and an EL (elevation angle) axis, and to a control apparatus that uses such a control method.

Although the present invention is explained above in terms of a preferred embodiment, the present invention is not limited to that only. It should be understood that various other embodiments can be accomplished without departing from the spirit and the scope of the present invention. Furthermore, although the action and effects obtained with the constituent features of the present invention are explained in the embodiment, these action and effects are merely examples and do not limit the present invention.

The invention claimed is:

1. An antenna apparatus that executes a pointing control so as to point a directional antenna installed on a mobile body toward a satellite using a two-axis mechanism, the antenna pointing control apparatus comprising:

a support member supporting the directional antenna rotatably about an elevation axis;

a base pedestal supporting the directional antenna and the support member, the base pedestal being rotatable about an azimuth axis;

elevation axis rotating means for rotationally driving the directional antenna about the elevation axis;

azimuth axis rotating means for rotationally driving the directional antenna, the support member, and the base pedestal about the azimuth axis;

recording means for recognizing and recording movement and rocking of the mobile body once per prescribed cycle period;

measuring means for measuring a satellite bearing;

error detecting means for detecting a pointing error of the directional antenna based on a measurement result from the measuring means; and determining means for determining whether or not the satellite will pass within a prescribed region about an extension line of the azimuth axis of the mobile body based on the measurement result from the measuring means and a record from the recording means, the determining means issuing an instruction to control the elevation axis and the azimuth axis using a two-axis control in accordance with the pointing error from the error detecting means if the determining means determines that the satellite will not pass within the prescribed region about the extension line of the azimuth axis of the mobile body, and the determining means issuing an instruction to operate the azimuth axis rotating means and the elevation axis rotation means based on a virtual three-axis control that assumes a virtual cross elevation axis exists and controls the elevation axis and the azimuth axis in accordance with the pointing error from the error detecting means if the determining means determines that the satellite will pass within the prescribed region about the extension line of the azimuth axis of the mobile body.

2. The antenna pointing control apparatus of claim 1, wherein the mobile body is a ship.

3. The antenna pointing control apparatus of claim 1, wherein the prescribed region about the extension line of the azimuth axis is a region within ±5 degrees relative to the extension line of the azimuth axis.

4. An antenna attitude control method for executing a pointing control to point a directional antenna installed on a mobile body toward a satellite using a two-axis mechanism, the method comprising:

recording movement and rocking of the mobile body once per prescribed cycle period;

measuring a satellite bearing;

detecting a pointing error of the directional antenna based on a measurement result;

determining whether or not the satellite will pass through a prescribed region about an extension line of an azimuth axis of the mobile body based on a measurement result and a record of the mobile body;

controlling an elevation axis and the azimuth axis using a two-axis control in accordance with the pointing error from the error detecting means if it is determined that the satellite will not pass within the prescribed region about the extension line of the azimuth axis of the mobile body; and assuming that a virtual cross elevation axis exists in accordance with a pointing error from the error detecting means and for controlling the elevation axis and the azimuth axis using a virtual three-axis control if it is determined that the satellite will pass within the prescribed region about the extension line of the azimuth axis of the mobile body.

5. The antenna attitude control method of claim 4, wherein the mobile body is a ship.

6. The antenna attitude control method of claim 4, wherein the prescribed region about the extension line of the azimuth axis is a region within ±5 degrees relative to the extension line of the azimuth axis.

7. The antenna attitude control method of claim 5, wherein the prescribed region about the extension line of the azimuth axis is a region within ±5 degrees relative to the extension line of the azimuth axis.

8. The antenna pointing control apparatus of claim 2, wherein the prescribed region about the extension line of the azimuth axis is a region within ±5 degrees relative to the extension line of the azimuth axis.

9. An antenna apparatus that executes a pointing control so as to point a directional antenna installed on a mobile body toward a satellite using a two-axis mechanism, the antenna pointing control apparatus comprising:

a support member supporting the directional antenna rotatably about an elevation axis;

a base pedestal supporting the directional antenna and the support member, the base pedestal being rotatable about an azimuth axis;

an elevation axis rotating mechanism which is configured to rotationally drive the directional antenna about the elevation axis;

an azimuth axis rotating mechanism that is configured to rotationally drive the directional antenna, the support member, and the base pedestal about the azimuth axis;

a recording device that is configured to recognize and record movement and rocking of the mobile body once per prescribed cycle period;

a measuring device that is configured to measure a satellite bearing;

an error detecting device that is configured to detect a pointing error of the directional antenna based on a measurement result from the measuring device; and a determining device that is configured to determine whether or not the satellite will pass within a prescribed region about an extension line of the azimuth axis of the mobile body based on the measurement result from the measuring device and a record from the recording device, the determining device being further configured to issue an instruction to control the elevation axis and the azimuth axis using a two-axis control in accordance with the pointing error from the error detecting device if the determining device determines that the satellite will not pass within the prescribed region about the extension line of the azimuth axis of the mobile body, and the determining device being further configured to issue an instruction to operate the azimuth axis rotating mechanism and the elevation axis rotation mechanism based on a virtual three-axis control that assumes a virtual cross elevation axis exists and controls the elevation axis and the azimuth axis in accordance with the pointing error from the error detecting device if the determining device determines that the satellite will pass within the prescribed region about the extension line of the azimuth axis of the mobile body.

10. The antenna pointing control apparatus of claim 9, wherein the mobile body is a ship.

11. The antenna pointing control apparatus of claim 9, wherein the prescribed region about the extension line of the azimuth axis is a region within ±5 degrees relative to the extension line of the azimuth axis.

12. The antenna pointing control apparatus of claim 10, wherein the prescribed region about the extension line of the azimuth axis is a region within ±5 degrees relative to the extension line of the azimuth axis.

* * * * *